United States Patent
Gupta et al.

(10) Patent No.: US 8,520,903 B2
(45) Date of Patent: Aug. 27, 2013

(54) METHOD AND SYSTEM OF ACCOUNTING FOR POSITIONAL VARIABILITY OF BIOMETRIC FEATURES

(75) Inventors: Gaurav Gupta, Noida (IN); Michael Peirce, Dublin (IE); Conor Robert White, Vienna, VA (US)

(73) Assignee: Daon Holdings Limited, George Town (KY)

( * ) Notice: Subject to any disclaimer, the term of this patent is extended or adjusted under 35 U.S.C. 154(b) by 429 days.

(21) Appl. No.: 12/697,703

(22) Filed: Feb. 1, 2010

(65) Prior Publication Data

US 2011/0188709 A1 Aug. 4, 2011

(51) Int. Cl.
*G06K 9/00* (2006.01)
*G06K 9/62* (2006.01)

(52) U.S. Cl.
USPC ............ 382/115; 382/124; 382/125; 382/209

(58) Field of Classification Search
None
See application file for complete search history.

(56) References Cited

U.S. PATENT DOCUMENTS

| | | |
|---|---|---|
| 4,747,147 A | 5/1988 | Sparrow |
| 4,752,966 A | 6/1988 | Schiller |
| 4,817,183 A | 3/1989 | Sparrow |
| 5,109,428 A | 4/1992 | Igaki et al. |
| 5,420,937 A | 5/1995 | Davis |
| 5,493,621 A | 2/1996 | Matsumura |
| 5,613,014 A | 3/1997 | Eshera et al. |
| 5,933,516 A | 8/1999 | Tu et al. |
| 5,982,914 A | 11/1999 | Lee et al. |
| 6,041,133 A | 3/2000 | Califano et al. |
| 6,049,621 A | 4/2000 | Jain et al. |
| 6,072,895 A | 6/2000 | Bolle et al. |
| 6,134,340 A | 10/2000 | Hsu et al. |
| 6,185,316 B1 | 2/2001 | Buffam |
| 6,185,317 B1 | 2/2001 | Nakayama |
| 6,185,318 B1 | 2/2001 | Jain et al. |

(Continued)

FOREIGN PATENT DOCUMENTS

| | | |
|---|---|---|
| EP | 2 073 147 A1 | 6/2009 |
| EP | 2 237 226 A1 | 10/2010 |

(Continued)

OTHER PUBLICATIONS

"A secure fingerprint matching technique," Yang et al., Proceedings of the 2003 ACM SIGMM workshop on Biometrics methods and applications, Nov. 2003.

(Continued)

*Primary Examiner* — David Zarka
*Assistant Examiner* — Jhere Rowland
(74) *Attorney, Agent, or Firm* — Kevin McDermott, Esq.

(57) ABSTRACT

A method of text-based authentication that accounts for positional variability of biometric features between captured biometric data samples includes capturing biometric data for a desired biometric type from an individual, and processing the captured biometric data to generate a biometric image and a biometric feature template. A selected conversion algorithm is executed by superimposing a positional relationship medium on the biometric image. The positional relationship medium includes a plurality of cells textually describable with words derivable from the positional relationship medium. The positions of biometric features are permitted to vary in overlapping border regions within the positional relationship medium. The method also includes identifying the position of at least one biometric feature within the overlapping border regions and generating a plurality of words for the at least one biometric feature.

19 Claims, 10 Drawing Sheets

(56) References Cited

U.S. PATENT DOCUMENTS

| | | | |
|---|---|---|---|
| 6,219,794 B1 | 4/2001 | Soutar et al. | |
| 6,266,433 B1 | 7/2001 | Bolle et al. | |
| 6,282,304 B1 | 8/2001 | Novikov et al. | |
| 6,314,197 B1 | 11/2001 | Jain et al. | |
| 6,330,347 B1 | 12/2001 | Vajna | |
| 6,487,306 B1 | 11/2002 | Jain et al. | |
| 6,546,122 B1 * | 4/2003 | Russo | 382/125 |
| 6,571,014 B1 | 5/2003 | Larkin | |
| 6,681,034 B1 | 1/2004 | Russo | |
| 6,735,695 B1 | 5/2004 | Gopalakrishnan et al. | |
| 6,766,040 B1 | 7/2004 | Catalano et al. | |
| 6,778,687 B2 | 8/2004 | Sanders et al. | |
| 6,778,688 B2 | 8/2004 | Aggarwal et al. | |
| 6,895,104 B2 | 5/2005 | Wendt et al. | |
| 6,941,003 B2 | 9/2005 | Ziesig | |
| 6,941,461 B2 | 9/2005 | Carro et al. | |
| 6,963,659 B2 | 11/2005 | Tumey et al. | |
| 7,099,498 B2 | 8/2006 | Lo | |
| 7,114,646 B2 | 10/2006 | Hillhouse | |
| 7,136,514 B1 | 11/2006 | Wong | |
| 7,151,846 B1 | 12/2006 | Fujii | |
| 7,172,113 B2 | 2/2007 | Olenick et al. | |
| 7,194,393 B2 | 3/2007 | Wei et al. | |
| 7,206,437 B2 | 4/2007 | Kramer et al. | |
| 7,233,685 B2 | 6/2007 | Miyasaka et al. | |
| 7,236,617 B1 | 6/2007 | Yau et al. | |
| 7,274,804 B2 | 9/2007 | Hamid | |
| 7,274,807 B2 | 9/2007 | Hillhouse et al. | |
| 7,308,708 B2 | 12/2007 | Blume | |
| 7,315,634 B2 | 1/2008 | Martin | |
| 7,327,859 B1 | 2/2008 | Chau et al. | |
| 7,349,559 B2 | 3/2008 | Miyasaka | |
| 7,359,532 B2 | 4/2008 | Acharya et al. | |
| 7,391,891 B2 * | 6/2008 | Hillhouse | 382/124 |
| 7,400,749 B2 | 7/2008 | Hillhouse | |
| 7,447,339 B2 | 11/2008 | Mimura et al. | |
| 7,461,266 B2 | 12/2008 | Chou | |
| 7,474,773 B2 | 1/2009 | Chau | |
| 7,492,925 B2 | 2/2009 | Silvester | |
| 7,505,613 B2 | 3/2009 | Russo | |
| 7,512,807 B2 | 3/2009 | Hillhouse | |
| 7,564,997 B2 * | 7/2009 | Hamid | 382/124 |
| 7,565,548 B2 | 7/2009 | Fiske et al. | |
| 2002/0018585 A1 | 2/2002 | Kim | |
| 2002/0031245 A1 | 3/2002 | Rozenberg et al. | |
| 2003/0031340 A1 | 2/2003 | Alattar et al. | |
| 2003/0044052 A1 | 3/2003 | Martin | |
| 2003/0223624 A1 | 12/2003 | Hamid | |
| 2004/0042645 A1 | 3/2004 | Wang | |
| 2004/0111625 A1 | 6/2004 | Duffy et al. | |
| 2004/0114786 A1 | 6/2004 | Cannon et al. | |
| 2004/0193893 A1 | 9/2004 | Braithwaite et al. | |
| 2004/0230810 A1 | 11/2004 | Hillhouse | |
| 2005/0084143 A1 | 4/2005 | Kramer et al. | |
| 2006/0047970 A1 | 3/2006 | Mochizuki | |
| 2006/0078171 A1 | 4/2006 | Govindaraju et al. | |
| 2006/0098850 A1 | 5/2006 | Hamid | |
| 2006/0101281 A1 | 5/2006 | Zhang et al. | |
| 2006/0104484 A1 | 5/2006 | Bolle et al. | |
| 2006/0104493 A1 | 5/2006 | Hsieh et al. | |
| 2006/0147094 A1 * | 7/2006 | Yoo | 382/117 |
| 2006/0210170 A1 | 9/2006 | Yumoto et al. | |
| 2007/0003114 A1 | 1/2007 | Hendriks et al. | |
| 2007/0009140 A1 | 1/2007 | Jitsui et al. | |
| 2007/0036400 A1 | 2/2007 | Watanabe et al. | |
| 2007/0096870 A1 | 5/2007 | Fisher | |
| 2007/0162963 A1 | 7/2007 | Penet et al. | |
| 2007/0183632 A1 | 8/2007 | Bringer et al. | |
| 2007/0226496 A1 | 9/2007 | Maletsky et al. | |
| 2007/0253608 A1 | 11/2007 | Tulyakov et al. | |
| 2007/0286465 A1 | 12/2007 | Takahashi et al. | |
| 2008/0013794 A1 | 1/2008 | Kalker et al. | |
| 2008/0013808 A1 | 1/2008 | Russo et al. | |
| 2008/0095410 A1 | 4/2008 | Shalev et al. | |
| 2008/0118099 A1 | 5/2008 | Alattar et al. | |
| 2008/0199077 A1 | 8/2008 | Fowell | |
| 2008/0298649 A1 | 12/2008 | Ennis et al. | |
| 2009/0023428 A1 | 1/2009 | Behzad et al. | |
| 2009/0027351 A1 | 1/2009 | Zhang et al. | |
| 2009/0113209 A1 | 4/2009 | Lee et al. | |
| 2009/0138724 A1 | 5/2009 | Chiou et al. | |
| 2009/0138725 A1 | 5/2009 | Madhvanath et al. | |
| 2009/0169064 A1 | 7/2009 | Kim et al. | |
| 2009/0183008 A1 | 7/2009 | Jobmann | |
| 2010/0135582 A1 * | 6/2010 | Gokturk et al. | 382/195 |
| 2010/0277274 A1 * | 11/2010 | Toleti et al. | 340/5.7 |
| 2012/0155778 A1 * | 6/2012 | Buchmueller et al. | 382/209 |

FOREIGN PATENT DOCUMENTS

| | | |
|---|---|---|
| FR | 2 917 525 | 12/2008 |
| GB | 2 050 026 A | 12/1980 |
| GB | 2 452 116 A | 2/2009 |
| JP | 2003-178307 | 6/2003 |
| WO | WO 87/01224 | 2/1987 |
| WO | WO 2009/004215 A2 | 1/2009 |
| WO | WO 2009/081866 A1 | 7/2009 |

OTHER PUBLICATIONS

"Generating Cancelable Fingerprint Templates," Ratha et al., Pattern Analysis and Machine Intelligence, IEEE Transactions on, Apr. 2007, vol. 29, Issue: 4 pp. 561-572.

"Efficient Finger Print Image Classification and Recognition using Neural Network Data Mining," Umamaheswari et al., International Conference, Feb. 2007, pp. 426-432.

"A cost-effective fingerprint recognition system for use with low-quality prints and damaged fingertips," Willis et al., Pattern Recognition 34 (2001) pp. 255-270.

Shihua He et al., Clustering-Based Descriptors for Fingerprint Indexing and Fast Retrieval, Computer Vision—ACCV 2009: 9th Asian Conf on Comp. Vision, Sep. 23, 2009, pp. 354-363.

Unsang Park et al., Periocular Biometrics in the Visible Spectrum: A Feasibility Study, Biometrics: Theory, Applications, and Systems 2009, Sep. 28, 2009, pp. 1-6.

Di Liu et al., Bag-of-Words Vector Quantization Based Face Identification, Electronic Commerce and Security, May 22, 2009, pp. 29-33.

Josef Sivic et al., Person Spotting: Video Shot Retrieval for Face Sets, Image and Video Retrieval, Aug. 4, 2005, pp. 226-236.

Fergus R. et al., Object Class Recognition by Unsupervised Scale-Invarient Learning, IEEE Comp. Society Conf. on Comp. Vision and Pattern Recognition, Jun. 18, 2003, pp. 264-271.

Sivic et al., Video Google: A Text Retrieval Approach to Object Matching in Videos, 9th IEEE Int. Conf. on Computer Vision, Oct. 13, 2003, pp. 1470-1477, vol. 2.

Omar Hamdoun et al., Person Re-Identification in Multi-Camera System by Signature Based on Interest Point Descriptors Collected on Short Video Sequences, Sep. 7, 2008, pp. 1-6.

Extended European Seach Report for counterpart foreign application EPO No. 11152341.1, mailed Apr. 28, 2011.

Extended European Search Report for EPO application No. 11152343.7, mailed Apr. 28, 2011.

* cited by examiner

DATA DOCUMENT — 44

BIOGRAPHIC DATA — 46

Individual's Name: Florence D. Soltis

Date of Birth: October 3, 1927

Address: 42 East Chestnut St., Wilkes Barre, PA

Marital Status: Single

Citizenship: United States

BIOMETRIC DATA — 48

| BIOMETRIC TYPE — 50 | BIOMETRIC TEXT STRING — 52 |
|---|---|
| Finger – Left Index | R22R23C8C9  R22R23C9C10 |
| | R20R21C8C9 |
| | R21R22C6C7  R22R23C6C7 |
| | R24R25C2C3 |
| | R26R27C2C3, R27R28C1C2 |
| | R30R3100C1, R3R4C6C7 |
| | R14R1500C1, R16R17C9C10 |
| Finger – Right Index | |
| Iris - Left | |
| Iris - Right | |

| DATA DOCUMENT | |
|---|---|
| BIOGRAPHIC DATA – 46 | |
| Individual's Name: | Florence D. Soltis |
| Date of Birth: | October 3, 1927 |
| Address: | 42 East Chestnut St., Wilkes Barre, PA |
| Marital Status: | Single |
| Citizenship: | United States |

BIOMETRIC DATA – 48

| BIOMETRIC TYPE – 50 | BIOMETRIC TEXT – 52 STRING |
|---|---|
| Finger – Left Index | S22B9 S22B10<br>S20B9<br>S22B7 S21B7<br>S24B3<br>S26B3, S27B2<br>S30B1, S3B7<br>S14B1, S16B10 |
| Finger – Right Index | |
| Iris - Left | |
| Iris - Right | |

METHOD AND SYSTEM OF ACCOUNTING FOR POSITIONAL VARIABILITY OF BIOMETRIC FEATURES

BACKGROUND OF THE INVENTION

This invention relates generally to authenticating individuals, and more particularly, to a method and system of accounting for positional variability of biometric features during authentication.

Generally, biometric authentication systems are used to identify and verify the identity of individuals and are used in many different contexts such as verifying the identity of individuals entering a country using electronic passports. Biometric authentication systems have also been known to verify the identity of individuals using driver's licenses, traveler's tokens, employee identity cards and banking cards.

Known biometric authentication system search engines generally identify individuals using biometric feature templates derived from raw biometric data captured from individuals during enrollment in the authentication system. Specifically, a biometric feature template derived from biometric data captured from an individual during authentication is compared against a database of previously derived biometric feature templates, and the identity of the individual is verified upon determining a match between one of the stored biometric feature templates and the biometric feature template derived during authentication. However, comparing biometric feature templates against a database of biometric feature templates may place substantial demands on computer system memory and processing which may result in unacceptably long authentication periods. Moreover, such known biometric authentication system search engines are generally highly specialized and proprietary.

By virtue of being highly specialized and proprietary it has been known to be difficult, time consuming and costly to modify known biometric authentication search engines to operate with other authentication systems. Furthermore, known biometric authentication search engines, by virtue of evaluating only biometric data of an individual for authentication, in many cases, do not provide an adequate amount of information about the individual to yield consistently accurate authentication results.

BRIEF DESCRIPTION OF THE INVENTION

In one aspect of the invention, a method of text-based authentication that accounts for positional variability of biometric features between captured biometric data samples is provided. The method includes capturing biometric data for a desired biometric type from an individual, processing the captured biometric data to generate a biometric image and a biometric feature template, and selecting a conversion algorithm for converting the captured biometric data into words. The conversion algorithm is stored in a server system. The method also includes executing the selected conversion algorithm by superimposing a positional relationship medium on the biometric image.

The positional relationship medium includes a plurality of cells textually describable with words derivable from the positional relationship medium, and adjacent cells included in the plurality of cells include a common border therebetween. Moreover, the method includes expanding the common borders such that the common borders overlap to establish an overlapping border region between respective adjacent cells. The positions of biometric features are permitted to vary in the overlapping border regions. Furthermore, the method includes identifying the position of at least one biometric feature within the overlapping border regions and generating a plurality of words for the at least one biometric feature.

In another aspect of the invention a system for text-based biometric authentication that accounts for positional variability of biometric features between captured biometric data samples is provided. The system includes a computer configured as a server. The server includes at least a data base and is configured to store within the database biometric feature templates derived from biometric data and at least a data document gallery comprising a plurality of data documents. Each data document includes biographic and biometric data of an individual as well as enrollment biometric words of the individual. The system also includes at least one client system positioned at an authentication station. The client system includes at least a computer operationally coupled to the server and is configured to at least capture biometric data for a desired biometric type from an unauthenticated individual.

The server is further configured to generate a biometric image and a biometric feature template from the captured biometric data, and select one of a plurality of conversion algorithms for converting the captured biometric data into words. Moreover, the server is configured to execute the selected conversion algorithm by superimposing a positional relationship medium on the generated biometric image. The positional relationship medium includes a plurality of cells textually describable with words derivable from the positional relationship medium, and adjacent cells included in the plurality of cells include a common border therebetween. Furthermore, the server is configured to expand the common borders such that the common borders overlap to establish an overlapping border region between respective adjacent cells. The positions of the biometric features are permitted to vary in the overlapping border regions. The server is also configured to identify the position of at least one biometric feature within one of the overlapping border regions and generate a plurality of words for the at least one biometric feature.

In yet another aspect of the invention, a method of text-based biometric authentication that accounts for positional variability of biometric features between captured biometric data samples is provided. The method includes generating a plurality of cells that each include at least one border, and positioning cells adjacent each other to define a border between each pair of adjacent cells. The method also includes capturing biometric data for a desired biometric type from an individual and storing the captured biometric data in a server system. Moreover, the method includes determining that at least one biometric feature included in the captured biometric data is positioned proximate the border between at least one of the pairs of adjacent cells, identifying the position of the at least one biometric feature as being within each cell of the at least one pair of adjacent cells, and deriving a plurality of words. Each word is derived from a corresponding cell of the at least one pair of adjacent cells to describe the position of the at least one biometric feature.

BRIEF DESCRIPTION OF THE DRAWINGS

FIG. 7 is an exemplary data document including biographic and biometric data collected from an individual;

FIG. 8 is an alternative exemplary data document including biographic and biometric data collected from an individual;

DETAILED DESCRIPTION OF THE INVENTION

Figure 1:
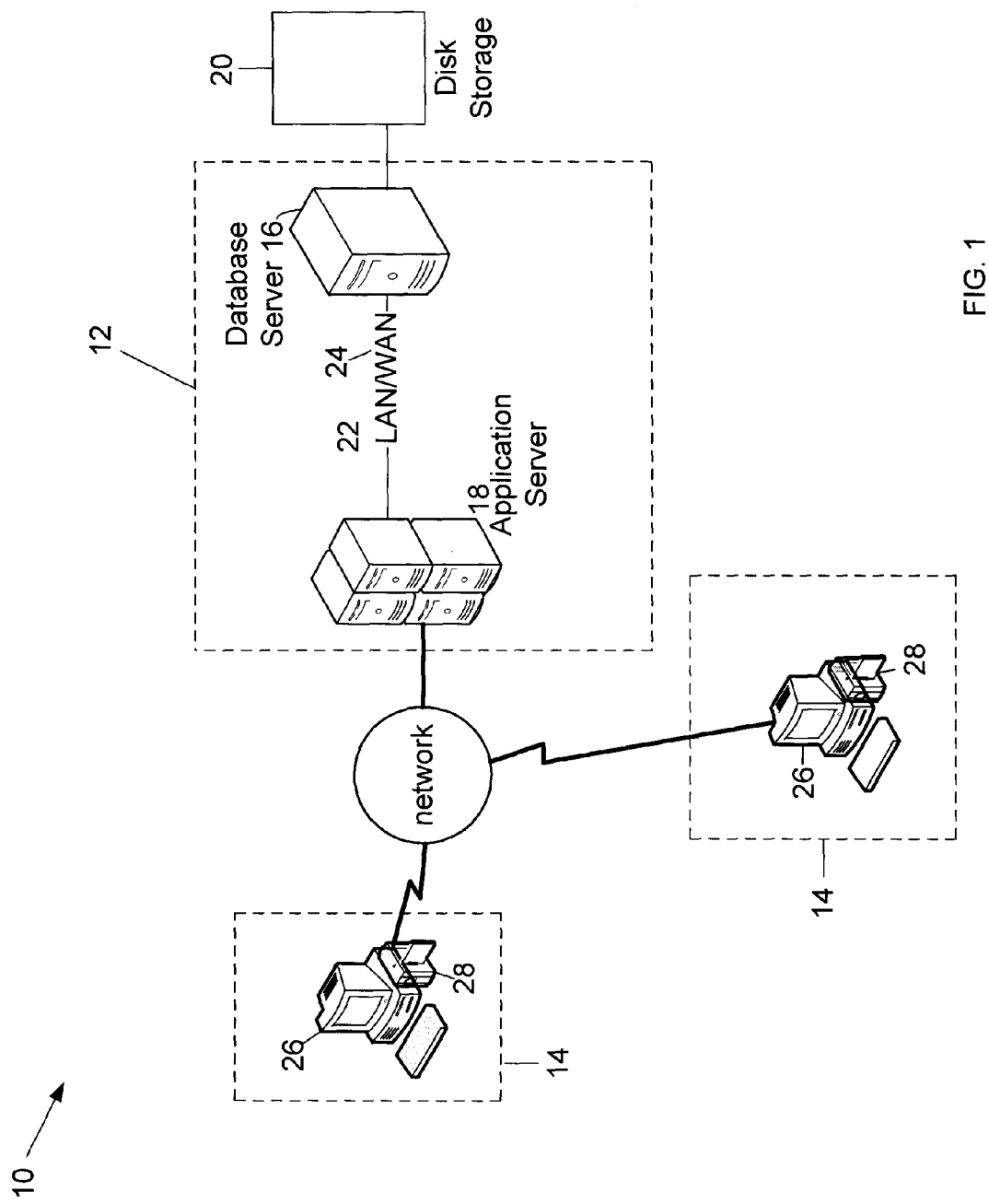
FIG. 1 is a block diagram of an exemplary embodiment of a server architecture of a computer system used for authenticating the identity of an individual.

FIG. 1 is an expanded block diagram of an exemplary embodiment of a server architecture of an authentication computer (AC) system 10 used for authenticating the identity of an individual. The AC system 10 includes a server system 12 and client computer systems 14. It should be appreciated that client computer systems 14 are generally positioned at authentication stations (not shown) and are operated by any individual authorized to access the server system 12 such as, but not limited to, authorization station security personnel. In the exemplary embodiment, the server system 12 includes components such as, but not limited to, a database server 16 and an application server 18. A disk storage unit 20 is coupled to the database server 16. It should be appreciated that the disk storage unit 20 may be any kind of data storage and may store any kind of data. For example, the disk storage unit 20 may store at least captured biometric data, biometric feature templates, conversion algorithms, and authentication data in the form of data documents including biographic and biometric data of individuals. Servers 16 and 18 are coupled in a local area network (LAN) 22. However, it should be appreciated that in other embodiments the servers 16 and 18 may be coupled together in any manner including in a wide area network (WAN) 24. Moreover, it should be appreciated that in other embodiments additional servers may be included in the server system 12 that perform the same functions as servers 16 and 18, or perform different functions than servers 16 and 18.

The database server 16 is connected to a database that is stored on the disk storage unit 20, and can be accessed by authorized users from any of the client computer systems 14 by logging onto the server system 12. The database may be configured to store documents in a relational object database or a hierarchical database. Moreover the database may be configured to store data in formats such as, but not limited to, text documents and binary documents. In an alternative embodiment, the database is stored remotely from the server system 12. The application server 18 is configured to at least generate biometric feature templates from captured biometric data, execute conversion algorithms, perform matching of any feature or information associated with individuals to authenticate the identity of individuals, compile a list of potential matches and rank the matches in the potential list of matches.

The server system 12 is typically configured to be communicatively coupled to client computer systems 14 using the Local Area Network (LAN) 22. However, it should be appreciated that in other embodiments, the server system 12 may be communicatively coupled to end users at computer systems 14 via any kind of network including, but not limited to, a Wide Area Network (WAN), the Internet, and any combination of LAN, WAN and the Internet. It should be understood that any authorized end user at the client computer systems 14 can access the server system 12.

In the exemplary embodiment, each of the client computer systems 14 includes at least one personal computer 26 configured to communicate with the server system 12. Moreover, the personal computers 26 include devices, such as, but not limited to, a CD-ROM drive for reading data from computer-readable recording mediums, such as a compact disc-read only memory (CD-ROM.), a magneto-optical disc (MOD) and a digital versatile disc (DVD). Additionally, the personal computers 26 include a memory (not shown). Moreover, the personal computers 26 include display devices, such as, but not limited to, liquid crystal displays (LCD), cathode ray tubes (CRT) and color monitors. Furthermore, the personal computers 26 include printers and input devices such as, but not limited to, a mouse (not shown), keypad (not shown), a keyboard, a microphone (not shown), and biometric capture devices 28. In other embodiments, the computers 26 may be configured to execute conversion algorithms. Although the client computer systems 14 are personal computers 26 in the exemplary embodiment, it should be appreciated that in other embodiments the client computer systems 14 may be portable communications devices capable of at least displaying messages and images, and capturing and transmitting authentication data. Such portable communications devices include, but are not limited to, smart phones and any type of portable communications device having wireless capabilities such as a personal digital assistant (PDA) and a laptop computer. Moreover, it should be appreciated that in other embodiments the client computer systems 14 may be any computer system that facilitates authenticating the identity of an individual as described herein, such as, but not limited to, server systems.

Each of the biometric capture devices 28 includes hardware configured to capture at least one specific type of biometric sample. In the exemplary embodiment, each biometric capture device 28 may be any device that captures any type of desired biometric sample that facilitates authenticating the identity of an individual as described herein. Such devices include, but are not limited to, microphones, iris scanners, fingerprint scanners, vascular scanners and digital cameras. It should be appreciated that although the exemplary embodiment includes two client computer systems 14 each including at least one personal computer 26, in other embodiments any number of client computer systems 14 may be provided and each of the client computer systems 14 may include any number of personal computers 26 that facilitates authenticating the identity of individuals as described herein.

Application server 18 and each personal computer 26 includes a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that computer programs, or instructions, are stored on a computer-readable recording medium, such as the memory (not shown) of application server 18 and of the personal computers 26, and are executed by the corresponding processor. The above examples are exemplary only, and are thus not intended to limit in any way the definition and/or meaning of the term "processor."

The memory (not shown) included in application server 18 and in the personal computers 26, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

It should be appreciated that the memory of the application server 18 and of the personal computers 26 is used to store executable instructions, applications or computer programs, thereon. The term "computer program" or "application" is intended to encompass an executable program that exists permanently or temporarily on any computer-readable recordable medium that causes the computer or computer processor to execute the program. In the exemplary embodiment, a parser application and a generic filtering module (GFM) application are stored in the memory of the application server 18. It should be appreciated that the parser application causes the application server 18 to convert biometric feature template data into text-strings according to a selected algorithm, and that at least some of the text-strings are included in a probe used by the GFM application. Moreover, it should be appreciated that the GFM application is a text search engine which causes the application server 18 to compare the probe against data documents stored in the server system 12. The GFM application causes the application server 18 to generate a list of potential matches according to the similarity between the probe and the data documents in the server system 12. Furthermore, it should be appreciated that the GFM application causes the application server 18 to determine the similarity between the probe and data documents using one of a plurality of authentication policies and rules included in the GFM application itself. However, it should be appreciated that in other embodiments the authentication policies and rules may be stored in the server system 12 separate from the GFM application. It should be understood that the authentication policies may determine the similarity between a probe and the data documents on any basis, such as, but not limited to, according to the number of matching words between the probe and each of the data documents. Although the parser application is stored in the application server 18 in the exemplary embodiment, it should be appreciated that in other embodiments the parser application may be stored in the computers 26 such that the computers 26 may convert biometric feature template data into text strings according to a selected algorithm. Moreover, it should be appreciated that in other embodiments the computers 26 may store conversion algorithms therein.

Figure 2:
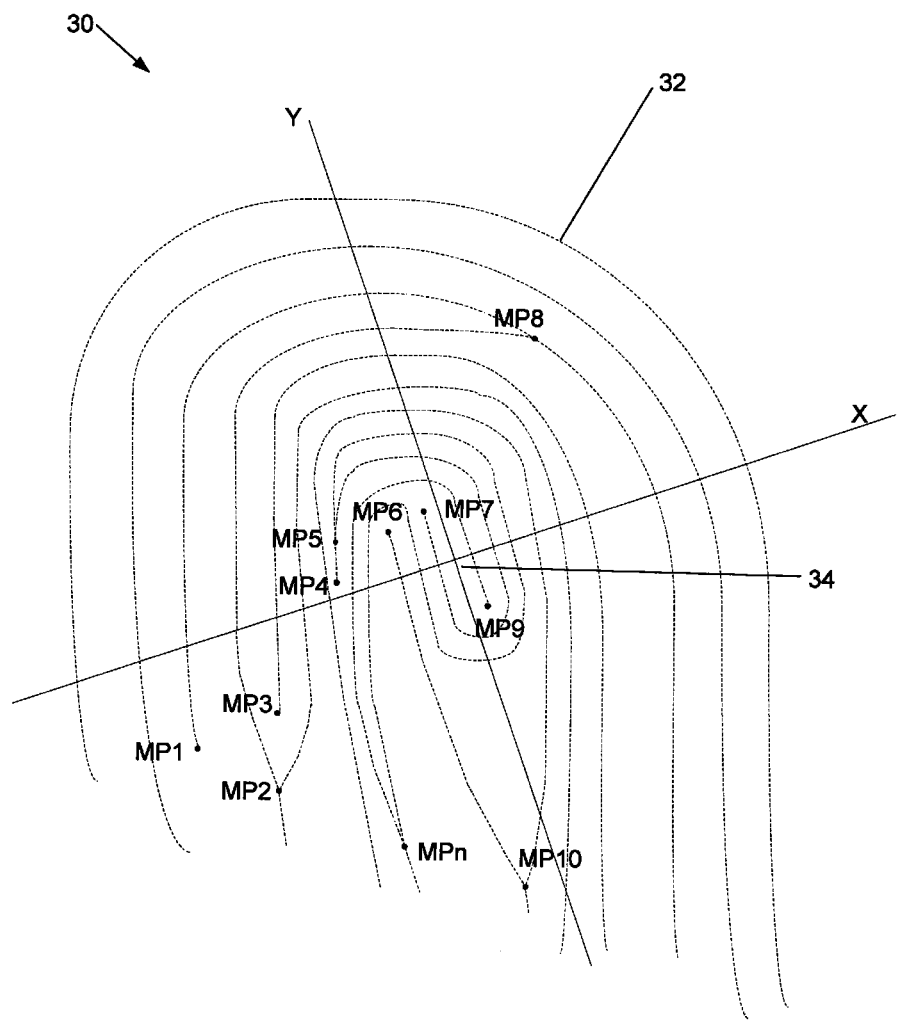
FIG. 2 is a plan view of an exemplary fingerprint image of processed biometric data.

FIG. 2 is a plan view of an exemplary fingerprint image 30 including minutia points MPn. The fingerprint image 30 constitutes biometric data captured from an individual using one of the biometric capture devices 28, and includes biometric features such as, but not limited to, ridge endings and ridge bifurcations. Because these biometric features constitute small discrete points in the fingerprint 30, they are referred to as minutia points MPn. Thus, the minutia points MPn represent biometric features of the captured biometric data. The locations of minutia points MPn within the fingerprint image 30 are determined and are included as a collection of minutia data points in a generated biometric feature template. In the exemplary embodiment, the biometric features are extracted from the captured biometric data by the application server 18 and are included as data in a biometric feature template generated by the application server 18. That is, the minutia points are extracted from the fingerprint and are included in the biometric feature template. It should be understood that biometric feature templates are usually a compact representation of the biometric features included in the captured biometric data, and are used for authenticating individuals. The captured biometric data is usually stored in the server system 12.

Although the captured biometric data is described as a fingerprint in the exemplary embodiment, it should be appreciated that in other embodiments biometric data of different biometric types may be captured. Such different biometric types include, but are not limited to, face, voice, and iris. Moreover, it should be appreciated that such different biometric types may have biometric features, different than ridge endings and ridge bifurcations as described in the exemplary embodiment, that can be extracted from the captured biometric data and included in a biometric feature template. For example, when iris biometric data is captured during authentication, phase information and masking information of the iris may be extracted from the captured iris biometric data and included in a biometric feature template. Although the captured biometric data is processed into a biometric feature template in the exemplary embodiment, it should be appreciated that in other embodiments the captured biometric data may be processed into any form that facilitates authenticating the individual, such as, but not limited to, photographs, images and electronic data representations.

A longitudinal direction of the ridges 32 in a core 34 of the fingerprint is used to determine the orientation of the image 30. Specifically, a Cartesian coordinate system is electronically superimposed on the image 30 by the application server 18 such that an axis Y is positioned to extend through the core 34 in the longitudinal direction, and another axis X is positioned to pass through the core 34 and to perpendicularly intersect the Y-axis at the core 34. It should be appreciated that the intersection of the X and Y axes constitutes an origin of the Cartesian coordinate system.

Figure 3:
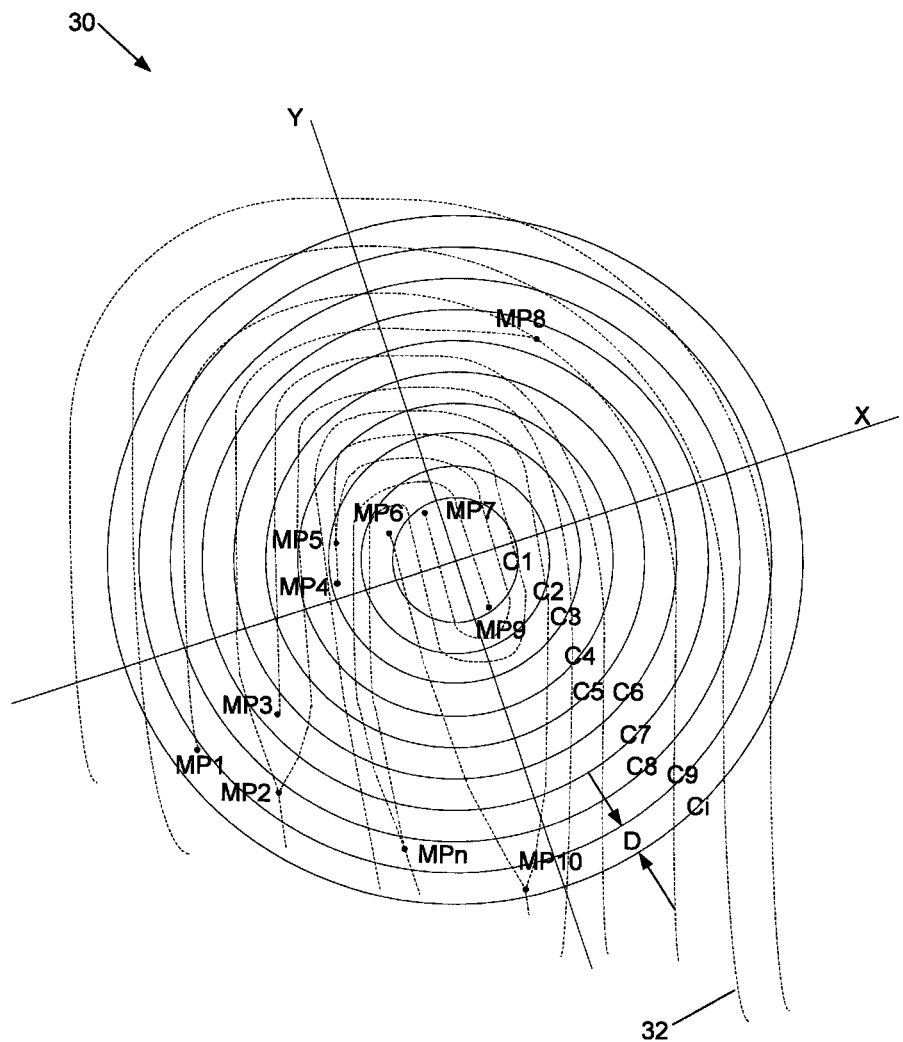
FIG. 3 is the plan view of the exemplary fingerprint image as shown in FIG. 2 including concentric circles positioned thereon.

FIG. 3 is the plan view of the exemplary fingerprint image 30 as shown in FIG. 2, further including a plurality of circles Ci electronically superimposed on the fingerprint image 30 by the application server 18 such that the circles Ci are concentrically positioned about the origin of the Cartesian coordinate system. In the exemplary embodiment, the circles Ci are positioned such that they are radially uniformly separated from each other by a distance D. It should be appreciated that the distance D may be any distance that facilitates authenticating the identity of an individual as described herein.

Figure 4:
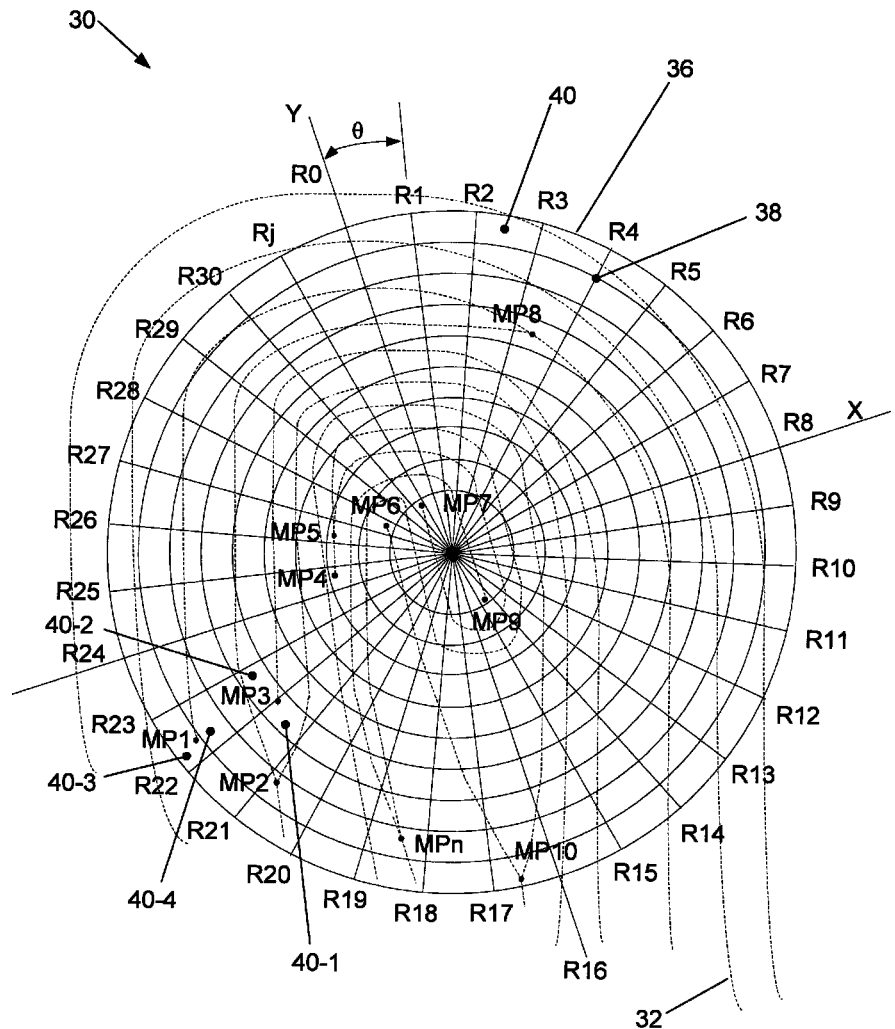
FIG. 4 is the plan view of the exemplary fingerprint image as shown in FIG. 2 including a radial grid positioned thereon for determining exemplary text strings from biometric data.

FIG. 4 is the plan view of the exemplary fingerprint image 30 as shown in FIG. 2 further including a radial grid 36 positioned thereon for determining exemplary text strings from biometric data. Specifically, a plurality of radial lines Rj are electronically superimposed and positioned on the fingerprint image 30 by the application server 18 such that the circles Ci and the lines Rj together define the radial grid 36 electronically superimposed on the fingerprint image 30. Each of the radial lines Rj is separated by a same angle $\theta$. It should be appreciated that the designations "n," "i," and "j," as used in conjunction with the minutia points MPn, circles Ci and radial lines Rj, respectively, are intended to indicate that any number "n" of minutia points, any number "i" of circles and any number "j" of radial lines may be used that facilitates authenticating the identity of an individual as described herein.

The radial lines Rj and circles Ci define a plurality of intersections 38 and a plurality of cells 40 in the radial grid 36.

Coordinates based on the Cartesian coordinate system are computed for each intersection 38 and for each minutia point MPn to determine the position of each minutia point MPn relative to the radial grid 36. Specifically, the coordinates of each minutia point MPn are compared against the coordinates of the intersections 38, to determine one of the cells 40 that corresponds to and contains, each minutia point MPn. For example, by comparing the coordinates of the minutia point MP8 against the coordinates 38, the application server 18 is configured to determine that one of the cells 40 defined by radial lines R3 and R4, and circles C6 and C7, contains the minutia point MP8. Because the minutia point MP8 is contained in a cell 40 defined by radial lines R3, R4 and circles C6, C7, the position of minutia point MP8 may be expressed in a text string using radial line and circle designations derived from the radial grid 36. Specifically, in the exemplary embodiment, the position of the minutia point MP8 is expressed in the alphanumeric text string R3R4C6C7. Consequently, it should be understood that the position of each one of the minutia points MPn may be described textually in an alphanumeric text string derived from its corresponding cell 40. As such, it should be understood that superimposing the radial grid 36 on the fingerprint image 30 facilitates converting the minutia points MPn into text strings. It should be appreciated that any number of minutia points MPn may be positioned in any one of the cells 40 and that desirably, each of the minutia points MPn is positioned in a single one of the cells 40.

It should be understood that each alphanumeric text string constitutes an alphanumeric word that facilitates textually describing biometric features included in captured biometric data that is to be used for authentication. Moreover, it should be appreciated that because each word is derived from the position of a corresponding cell 40, each cell 40 of the radial grid 36 constitutes a word that may be used to facilitate textually describing biometric features included in captured biometric data that are to be used for authentication. Furthermore, because the radial grid 36 includes a plurality of cells 40, the radial grid 36 defines a plurality of words that may be used to facilitate textually describing biometric features included in captured biometric data that are to be used for authentication. Additionally, because a plurality of words constitutes a vocabulary, the radial grid 36 itself constitutes a vehicle for defining a vocabulary of words that may be used to facilitate textually describing biometric features included in captured biometric data that are to be used for authentication. Thus, it should be understood that by using the radial grid 36 as described in the exemplary embodiment, an algorithm is executed that converts captured biometric data into words, included in a vocabulary of words, that may be used as the basis for authenticating the identity of an individual.

It should be understood that biometric data samples captured for an identical biometric type may vary each time the biometric data sample is captured. Consequently, the positions of the biometric features included in the captured biometric data samples, and minutia points corresponding to the biometric features, may also vary. It should be appreciated that the minutia point variances generally do not effect the positions, and related words, of minutia points MPn within the grid 36. However, the minutia point variances may effect the positions, and related words, of minutia points MPn positioned proximate to or on a border between adjacent cells 40. It should be appreciated that by virtue of defining the plurality of cells 40, the radial lines Rj and circles Ci also define the borders between adjacent cells 40. Thus, minutia points positioned proximate to or on a radial line Rj or a circle Ci, may be located in different cells 40 in different biometric data samples captured for the identical biometric type. Minutia points MPn positioned proximate to or on a line Rj or a circle Ci are referred to herein as borderline minutia points.

Minutia point MP3 is positioned in a first cell 40-1 proximate the border R22 between the first cell 40-1 and a second cell 40-2 included in the radial grid 36. Thus, minutia point MP3 is a borderline minutia point whose position within the grid 36 may vary between different biometric data samples captured for the identical biometric type. Specifically, the location of minutia point MP3 within the grid 36 may vary such that in one biometric data sample the minutia point MP3 is located in cell 40-1 proximate the radial line R22, and in another biometric data sample of the identical biometric type the minutia point MP3 is located in cell 40-2 proximate radial line R22. Minutia point MP1 is also a borderline minutia point and is located within a third cell 40-3 proximate the circle C9 between the third cell 40-3 and a fourth cell 40-4. Thus, the position of minutia point MP1 within the grid 36 may also vary between captured biometric data samples. That is, the position of minutia point MP1 within the grid 36 may vary, similar to minutia point MP3, between cells 40-3 and 40-4 in different biometric data samples of an identical biometric type. Thus, it may be difficult to accurately determine a single cell 40 location for borderline minutia points such as MP1 and MP3.

Figure 5:
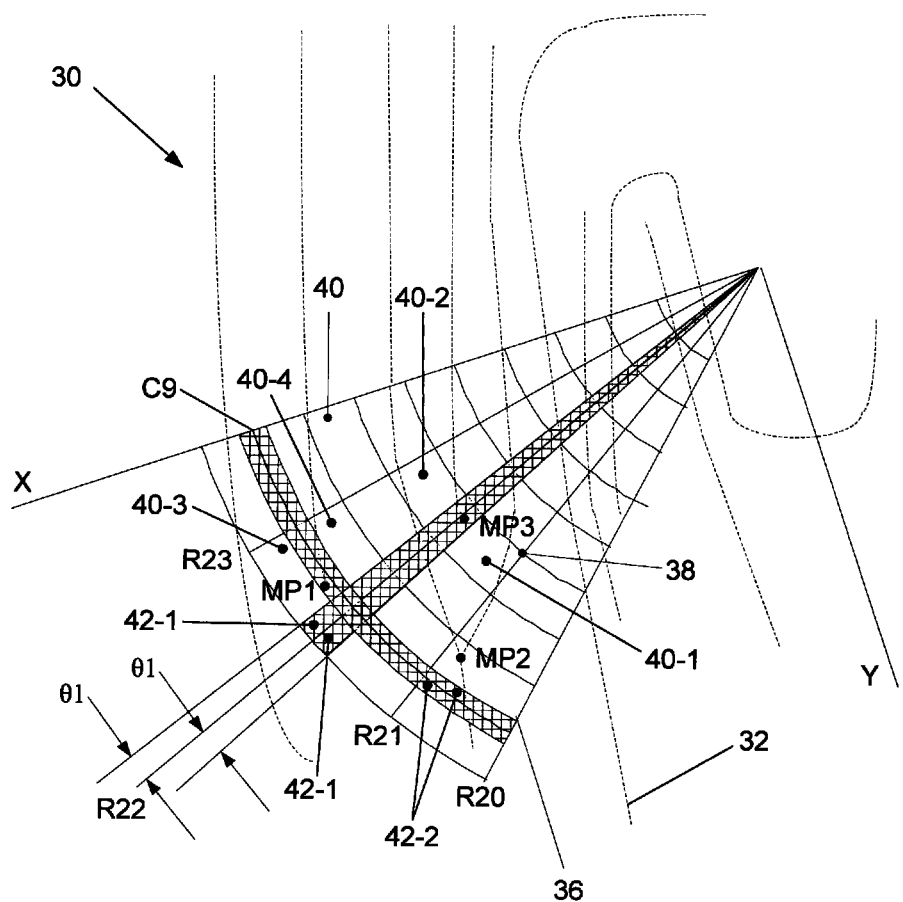
FIG. 5 is an enlarged partial plan view of FIG. 4.

The information shown in FIG. 5 is the same information shown in FIG. 4, but shown in a different format, as described in more detail below. As such, geometric and mathematical relationships illustrated in FIG. 5 that are identical to geometric and mathematical relationships illustrated in FIG. 4, are identified using the same reference numerals used in FIG. 4.

FIG. 5 is an enlarged partial plan view of the exemplary fingerprint image 30 and radial grid 36 as shown in FIG. 4, further including an overlapping border region 42-1 positioned about radial line R22 and another overlapping border region 42-2 positioned about circle C9. The overlapping border region 42-1 is electronically superimposed on the grid 36 by the application server 18 and is formed by rotating the radial line R22 clockwise and counterclockwise about the origin of the Cartesian coordinate system by an angle θ1. In the exemplary embodiment, the angle θ1 is one degree. The overlapping border region 42-2 is electronically superimposed on the grid 36 by the application server 18 and is formed by radially offsetting the circle C9 towards and away from the center of the Cartesian coordinate system by a predetermined distance. In the exemplary embodiment, the predetermined distance may be any distance that adequately captures borderline minutia points as described herein.

The overlapping border regions 42-1 and 42-2 operate to effectively expand the borders of adjacent cells so that the borders of adjacent cells 40 overlap. Thus, the overlapping border regions 42-1 and 42-2 effectively establish an area, representing a tolerance of positions of minutia points MPn, about the borders R22 and C9, respectively, within which the position of minutia points MP1 and MP3 may vary. Thus, it should be appreciated that minutia points located within the overlapping border regions 42-1 and 42-2 are borderline minutia points. Moreover, it should be appreciated that the overlapping border regions 42-1 and 42-2 may be used to determine borderline minutia points. Furthermore, it should be appreciated that by effectively establishing an area within which the positions of minutia points may vary, the overlapping border regions 42-1 and 42-2 facilitate accounting for variances that may be introduced while capturing biometric data and thus facilitate increasing the accuracy of text-based biometric authentication as described herein.

In the exemplary embodiment, minutia point MP3 is located within the overlapping border region 42-1. Thus, to account for the possible positional variation of minutia point MP3, in the exemplary embodiment minutia point MP3 is considered to have two positions within the grid 36. That is, the minutia point MP3 is considered to be positioned in adjacent cells 40-1 and 40-2, and is described using words derived from adjacent cells 40-1 and 40-2. Specifically, the position of minutia point MP3 is described with the words R21R22C6C7 R22R23C6C7. Minutia point MP1 is located within the overlapping border region 42-2, and is also considered to have two positions within the grid 36. That is, minutia point MP1 is considered to be positioned in adjacent cells 40-3 and 40-4, and is described with words derived from cells 40-3 and 40-4. Specifically, the position of minutia point MP1 is described with the words R22R23C8C9 R22R23C9C10. It should be understood that multiple sequential words constitute sentences. Thus, because the words describing the positions of the minutia points MP1 and MP3 constitute multiple sequential words, the words describing the positions of the minutia points MP1 and MP3 are sentences.

It should be understood that the borderline minutia points MP1 and MP3 as described in the exemplary embodiment are positioned within overlapping border regions 42-2 and 42-1, respectively, and thus are described with words derived from two different cells 40. However, it should be appreciated that in other embodiments, borderline minutia points may be located at an intersection of different overlapping border regions, such as at the intersection of overlapping border regions 42-1 and 42-2. Such borderline minutia points located at the intersection of two different overlapping border regions are considered to have four different cell positions within the grid 36, and are described with words derived from four different cells 40.

Although the exemplary embodiment is described as using an angle θ1 of one degree, it should be appreciated that in other embodiments the angle θ1 may be any angle that is considered to define an overlapping border region large enough to capture likely borderline minutia points. Moreover, in other embodiments, instead of rotating the radial line R22 by the angle θ1 to define the overlapping border region 42-1, the radial line R22 may be offset to each side by a predetermined perpendicular distance, adequate to capture likely borderline minutia points, to define the overlapping border region 42-1. It should also be appreciated that although the exemplary embodiment is described using only one overlapping border region 42-1 for one radial line R22, and only one overlapping border region 42-2 for one circle C9, in other embodiments overlapping border regions may be positioned about each radial line Rj and each circle Ci, or any number of radial lines Rj and circles Ci that facilitates authenticating the identity of an individual as described herein.

In the exemplary embodiment, the words are defined such that the radial lines Rj are expressed first in sequentially increasing order, followed by the circles Ci which are also expressed in sequentially increasing order. It should be appreciated that in other embodiments the radial lines Rj and the circles Ci may be expressed in any order. Moreover, it should be appreciated that although the exemplary embodiment expresses the location of minutia points MPn in alphanumeric words, in other embodiments the words may be expressed in any manner, such as, but not limited to, only alphabetic characters and only numeric characters, that facilitates authenticating the identity of an individual as described herein.

Figure 6:
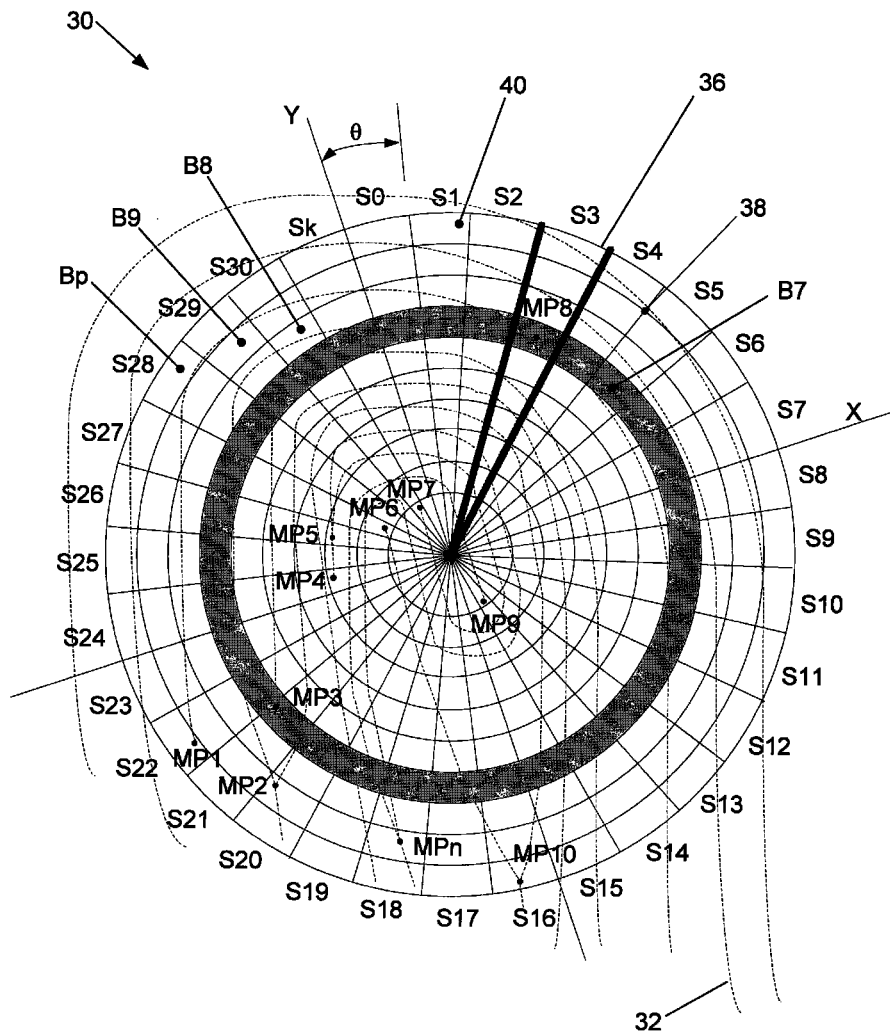
FIG. 6 is the plan view of the exemplary fingerprint image and radial grid as shown in FIG. 4 and is for determining alternative exemplary text strings from biometric data.

The information shown in FIG. 6 is the same information shown in FIG. 4, but shown in a different format, as described in more detail below. As such, geometric and mathematical relationships illustrated in FIG. 6 that are identical to geometric and mathematical relationships illustrated in FIG. 4, are identified using the same reference numerals used in FIG. 4.

FIG. 6 is the plan view of the exemplary fingerprint image 30 and radial grid 36 as shown in FIG. 4, and is for determining alternative exemplary text strings from captured biometric data. In this alternative embodiment, each adjacent pair of the radial lines Rj defines a sector Sk, and each adjacent pair of circles Ci defines a concentric band Bp. It should be appreciated that the designations "k" and "p" as used in conjunction with the sectors Sk and concentric bands Bp, respectively, are intended to convey that any number "k" of sectors Sk and any number "p" of concentric bands Bp may be used that facilitates authenticating the identity of an individual as described herein.

Coordinates based on the superimposed Cartesian coordinate system are computed for each intersection 38 and for each minutia point MPn to determine the position of each minutia point MPn relative to the radial grid 36. However, in contrast to the exemplary embodiment described with reference to FIG. 4, in this alternative exemplary embodiment, the coordinates of each minutia point MPn are compared against the coordinates of the intersections 38 to determine a corresponding sector Sk and a corresponding intersecting concentric band Bp that contain each minutia point MPn. For example, by comparing the coordinates of the minutia point MP8 against the coordinates 38, it is determined that the sector S3 and the concentric band B7 intersecting with sector S3, contain the minutia point MP8. By virtue of being contained in sector S3 and concentric band B7, the position of minutia point MP8 may be expressed in an alphanumeric word using sector Sk and concentric band Bp designations derived from the radial grid 36. Specifically, the position of the minutia point MP8 may be expressed with the word S3B7. Consequently, the position of each one of the minutia points MPn may be described in words derived from a corresponding sector Sk and concentric band Bp. As such, it should be understood that superimposing the radial grid 36 on the biometric image 30 facilitates converting the minutia points MPn into a vocabulary of alphanumeric words different from the vocabulary of the exemplary embodiment. Moreover, it should be appreciated that each sector Sk and concentric band Bp designation describes a cell 40.

It should be understood that in this alternative exemplary embodiment borderline minutia points such as MP1 and MP3 are also considered to have two positions within the grid 36. Thus, in this alternative exemplary embodiment, borderline minutia point MP1 is described with the words S22B9 S22B10 and borderline minutia point MP3 is described with the words S21B7 S22B7.

In this alternative exemplary embodiment, the words are defined such that the sectors Sk are expressed first and the concentric bands Bp are expressed second. However, it should be appreciated that in other embodiments the sectors Sk and the concentric bands Bp may be expressed in any order that facilitates authenticating the identity of an individual as described herein.

It should be appreciated that in yet other exemplary embodiments after obtaining the word for each cell 40, the words may be simplified, or translated, to correspond to a single cell number. For example, the word S0B0 may be translated to correspond to cell number zero; S1B0 may be translated to correspond to cell number one; S2B0 may be translated to correspond to cell number two; S31B0 may be translated to correspond to cell number 31; and, S0B1 may be translated to correspond to cell number 32. Thus, the words S0B0, S1B0, S2B0, S31B0 and S0B1 may simply be represented as single cell numbers 0, 1, 2, 31 and 32, respectively.

It should be understood that in this alternative exemplary embodiment the words describing the positions of minutia points MP1 and MP3 are sentences. Additionally, it should be appreciated that when the fingerprint image 30 includes a plurality of minutia points MPn, words corresponding to the minutia points may be sequentially positioned adjacent each other to form sentences. Such sentences may be generated, for example, by combining words that are nearest to the origin of the Cartesian co-ordinate system, starting with word S0B0, and proceeding clockwise and outwards to end at the word SkBp. However, it should be appreciated that in other embodiments the words are not required to be positioned sequentially, and may be positioned in any order to form a sentence that facilitates authenticating the identity of an individual as described herein.

Although this alternative exemplary embodiment includes the same radial grid 36 superimposed on the same biometric image 30 as the exemplary embodiment, it should be appreciated that the same radial grid 36 may be used to derive many different vocabularies in addition to those described herein. Moreover, although both of the exemplary embodiments described herein use the same radial grid 36 to derive different vocabularies, it should be appreciated that in other embodiments any other medium that establishes a positional relationship with the minutia points MPn of the fingerprint image 30 may be used as a vehicle for deriving at least one vocabulary of words that describes the positions of the minutia points MPn in the fingerprint image 30. Such mediums include, but are not limited to, rectangular grids, triangular grids, electronic models and mathematical functions. Furthermore, it should be appreciated that different vocabularies derived from different mediums may be combined to yield combined, or fused, vocabularies for the same biometric type and for different biometric types.

It should be understood that converting the minutia points MPn into words, as described herein, facilitates enabling the server system 12 to implement matching algorithms using industry standard textual search engines. Moreover, it should be understood that performing industry standard textual searches based on words derived from biometric feature template data as described herein, facilitates enabling the server system 12 to generate and return results to authentication station security personnel at client systems 14 more efficiently and more cost effectively than existing biometric systems and methods, and facilitates reducing dependence on expensive, specialized, and proprietary biometric matchers used in existing biometric authentication systems and methods.

It should be appreciated that using the grid 36 to generate a vocabulary of words as described in the exemplary embodiments, effectively executes an algorithm that generates a vocabulary of words for use in authenticating the identity of individuals based on captured biometric data. However, it should be appreciated that in other embodiments other known algorithms, or classification algorithms, may be used to generate additional alternative vocabularies by analyzing captured biometric data and classifying the captured biometric data into one or more finite number of groups. Such known classification algorithms include, but are not limited to, a Henry classification algorithm. The Henry classification algorithm examines a fingerprint global ridge pattern and classifies the fingerprint based on the global ridge pattern into one of a small number of possible groups, or patterns. The Henry classification algorithm includes at least an arch pattern and a left-loop pattern.

Consequently, in yet another alternative embodiment, another vocabulary of alphanumeric biometric words may be generated by mapping each Henry classification pattern to a corresponding word included in a vocabulary defined for the Henry classification algorithm. For example, the arch pattern in the Henry classification algorithm may be mapped, or assigned, the corresponding word "P1," and the left loop pattern may be mapped, or assigned, the corresponding word "P2." It should be appreciated that in other embodiments, vocabularies of words and sentences may be established for any classification algorithm, thus facilitating use of substantially all known classification algorithms to authenticate the identity of individuals as described herein. It should be appreciated that other classification algorithms may rely on distances between groups or bins. In such classification algorithms, a lexicographic text-encoding scheme for numeric data that preserves numeric comparison operators may be used. Such numerical comparison operators include, but are not limited to, a greater than symbol (>), and a less than symbol (<). Further examples of fingerprint classification techniques that could be utilized using this approach include, but are not limited to, ridge flow classification, ridge flow in a given fingerprint region, ridge counts between minutiae points, lines between minutiae points, and polygons formed between minutiae points.

As discussed above, using the grid 36 as described in the exemplary embodiments effectively constitutes executing an algorithm that generates a vocabulary of words that can be independently used for biometrically authenticating individuals. It should also be appreciated that other algorithms may define words for different biometric features of the same biometric type that may be independently used for authentication. For example, in another alternative embodiment, another algorithm may generate an additional vocabulary of words and sentences derived from the overall ridge pattern of a fingerprint instead of from fingerprint ridge endings and ridge bifurcations. Combining, or fusing, vocabularies that define words for the same biometric type, but for different biometric features, provides a larger amount of information that can be used to generate more trustworthy authentication results. Thus, it should be appreciated that by combining or fusing vocabularies, additional new vocabularies representing a same biometric type and different biometric features may be generated such that different words, from the combined vocabulary, representing the same biometric type may be used to generate more trustworthy authentication results. For example, when authenticating the identity of an individual on the basis of fingerprint biometric data, the identity may be authenticated using appropriate words from a vocabulary derived from fingerprint ridge endings and ridge bifurcations, and words from another vocabulary derived from the overall ridge pattern of the fingerprint. It should be appreciated that authenticating the identity of an individual using different words from a combined vocabulary representing the same biometric type and different biometric features facilitates increasing the level of trust in the authentication results.

Although the exemplary embodiments described herein use algorithms to facilitate enabling the server system 12 to convert biometric features of fingerprints into words that are included in a vocabulary of words defined by the conversion algorithms, it should be appreciated that in other embodiments different algorithms may be used to convert biometric features, of any desired biometric type, into words included in a vocabulary of words defined by the different algorithm. For example, a first algorithm may convert biometric features of the iris into words included in a first vocabulary of words defined by the first algorithm, and a second algorithm may convert biometric features of the voice into words included in a second vocabulary of words defined by the second algorithm. It should be understood that an additional third vocabulary of words including the first and second vocabularies may be generated by combining, or fusing, the first and second vocabularies. Combining, or fusing, vocabularies that define words for different biometric types also provides a larger amount of information that can be used to generate more trustworthy authentication results. Thus, it should be appreciated that by combining or fusing vocabularies, additional new vocabularies representing different biometric types may be generated such that different words, from the combined vocabulary, representing different biometric types may be used to generate more trustworthy authentication results. For example, when authenticating the identity of an individual on the basis of iris and voice biometric data, the identity may be authenticated using appropriate words from the first vocabulary and words from the second vocabulary. It should be appreciated that authenticating the identity of an individual using different words from a fused vocabulary representing different biometric types facilitates increasing the level of trust in the authentication results.

When a plurality of biometric types are used for authentication, configurable authentication policies and rules included in the GFM application may be configured to weigh some biometric types differently than others. Authentication based on certain biometric types is more trustworthy than authentication based on other biometric types. For example, a biometric authentication result based on biometric data captured from an iris may often be more trustworthy than an authentication result based on biometric data captured from a fingerprint. In order to account for the different levels of trust in the authentication results, each biometric type may be weighted differently. For example, in a fused vocabulary certain words may be directed towards a fingerprint of an individual and other words may be directed towards an iris of the same individual. Because authentication based on an iris is more trustworthy, during authentication the iris words are given greater emphasis, or are more heavily weighted, than the fingerprint words. Thus, yielding an overall more trustworthy authentication result.

It should be appreciated that words in fused vocabularies may also be weighted due to the source of the original words before fusion. For example, words from the vocabulary generated using the method of the exemplary embodiment may be weighted more heavily than words from the vocabulary generated using the alternative exemplary embodiment.

FIG. 7 is an exemplary data document 44 including biographic data 46 and biometric data 48 collected from an individual. In order to authenticate the identity of individuals with the server system 12, the biographic 46 and biometric data 48 of a plurality of individuals should be collected and stored in the server system 12 prior to authentication. Obtaining and storing such data prior to authentication is generally known as enrolling an individual. In the exemplary embodiment the data documents 44 for each individual enrolled in the server system 12 are stored in the server system 12 as record data. Moreover, it should be appreciated that the data documents 44 stored in server system 12 constitute a gallery of data.

In the exemplary embodiment, during enrollment each individual manually types the desired biographic data 46 into the keyboard associated with one of the client systems 14. In order to properly collect fingerprint biometric data, the client systems 14 are configured to include enrollment screens appropriate for collecting fingerprint biometric data, and are configured to include the biometric capture devices 28 for capturing fingerprint biometric data submitted by the individuals. However, it should be appreciated that in other embodiments, the biographic data 46 and biometric data 48 may be provided and entered into the server system 12 using any method that facilitates verifying the identity of individuals as described herein. Such methods include, but are not limited to, automatically reading the desired biographic data 46 and biometric data 48 from identity documents, and extracting the desired biographic data 46 and biometric data 48 from other databases positioned at different locations than the client system 14. Such identity documents include, but are not limited to, passports and driver's licenses. It should be understood that enrollment data of individuals constitutes both the biographic 46 and biometric data 48 collected from the individuals.

The term "biographic data" 46 as used herein includes any demographic information regarding an individual as well as contact information pertinent to the individual. Such demographic information includes, but is not limited to, an individual's name, age, date of birth, address, citizenship and marital status. Moreover, biographic data 46 may include contact information such as, but not limited to, telephone numbers and e-mail addresses. However, it should be appreciated that in other embodiments any desired biographic data 46 may be required, or, alternatively, in other embodiments biographic data 46 may not be required.

In the exemplary embodiment, the biometric data 48 includes biometric data captured during enrollment and a biometric feature template of the captured biometric data. Biometric data of the left index finger is captured during enrollment in the exemplary embodiment. Minutia points MPn included in the biometric feature template are each converted into a corresponding biometric text string 52, or word 52, using the algorithm of the exemplary embodiment as described with respect to FIG. 4. Because the words 52 are derived from biometric data captured during enrollment, the words 52 may also be referred to as enrollment biometric words 52. It should be appreciated that the words R22R23C8C9 R22R23C9C10 and R21R22C6C7 R22R23C6C7 describing minutia points MP1 and MP3, respectively, form sentences. Moreover, it should be appreciated that in other embodiments words 52 may include a prefix describing the biometric type. Thus, in other embodiments the words 52 describing minutia points of the left index finger may include a prefix, such as, but not limited to, FLI which abbreviates Finger-Left Index. Likewise, in other embodiments the words 52 describing minutia points of the right index finger may include a prefix such as, but not limited to, FRI which abbreviates Finger-Right Index. Thus, in such other embodiments, the words 52 describing minutia point MP1 of the left index finger may be represented as FLI R22R23C8C9 FLI R22R23C9C10, and the words 52 describing minutia point MP1 of the right index finger may be represented as FLI FRI R21R22C7C8 FLI FRIR21R22C8C9.

Although the biometric data 48 is described in the exemplary embodiment as including biometric data captured during enrollment, it should be appreciated that in other embodiments additional biometric data 48 may be added to the data documents 44 after enrollment. Moreover, it should be appreciated that in other embodiments the biometric data 48 may include different biometric words 52 generated by a different algorithm for the same biometric type. Furthermore, it should be appreciated that in other embodiments the biometric data 48 may include different types of biometric data 48 such as, but not limited to, face, iris and voice biometric data. Appropriate biometric words 52, corresponding to the different types of biometric data, may also be generated by appropriate algorithms and included in the data documents 44.

Although the data documents 44 are stored as record data in the server system 12 in the exemplary embodiment, it should be appreciated that in other embodiments the data documents 44 may be stored in any form such as, but not limited to, relational and hierarchical databases, text documents and XML documents.

The information shown in FIG. 8 is substantially the same information shown in FIG. 7, but includes words 52 that were converted using the radial grid 36 as described herein in the alternative exemplary embodiment associated with FIG. 6. As such, information illustrated in FIG. 8 that is identical to information illustrated in FIG. 7, is identified using the same reference numerals used in FIG. 7.

Figure 9:
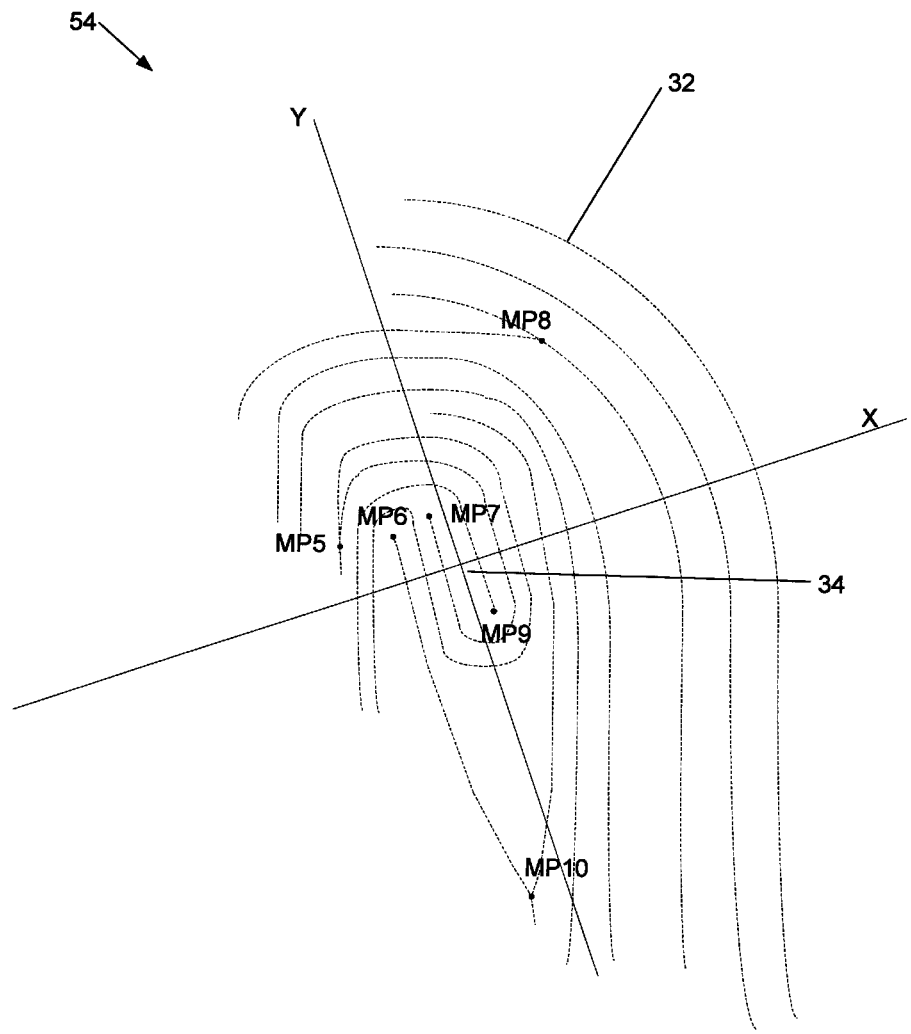
FIG. 9 is a plan view of an exemplary partial fingerprint image of processed biometric data.

The information shown in FIG. 9 is similar to the information shown in FIG. 2, but includes a partial left index fingerprint biometric image instead of a full left index fingerprint biometric image, as described in more detail below. As such, the information illustrated in FIG. 9 that is identical to information illustrated in FIG. 2, is identified using the same reference numerals used in FIG. 2.

FIG. 9 is a plan view of an exemplary partial fingerprint image 54 of a left index finger fingerprint captured from an individual during authentication in the exemplary embodiment. It should be understood that the partial fingerprint image 54 and the fingerprint image 30 are from the same finger of the same person. However, the partial fingerprint image 54 does not contain the same number of minutia points MPn as the fingerprint image 30. Moreover, it should be understood that such a partial print is generally used as the basis for authenticating the identity of an individual during authentication. Although the partial fingerprint image 54 is of a left index fingerprint, it should be appreciated that in other embodiments fingerprints of varying quality may be obtained from the same person. Such fingerprints include, but are not limited to, rotated fingerprints. It should be appreciated that all fingerprints are to be rotated to have an orientation reconciled with that of a corresponding record fingerprint prior to proper authentication.

Figure 10:
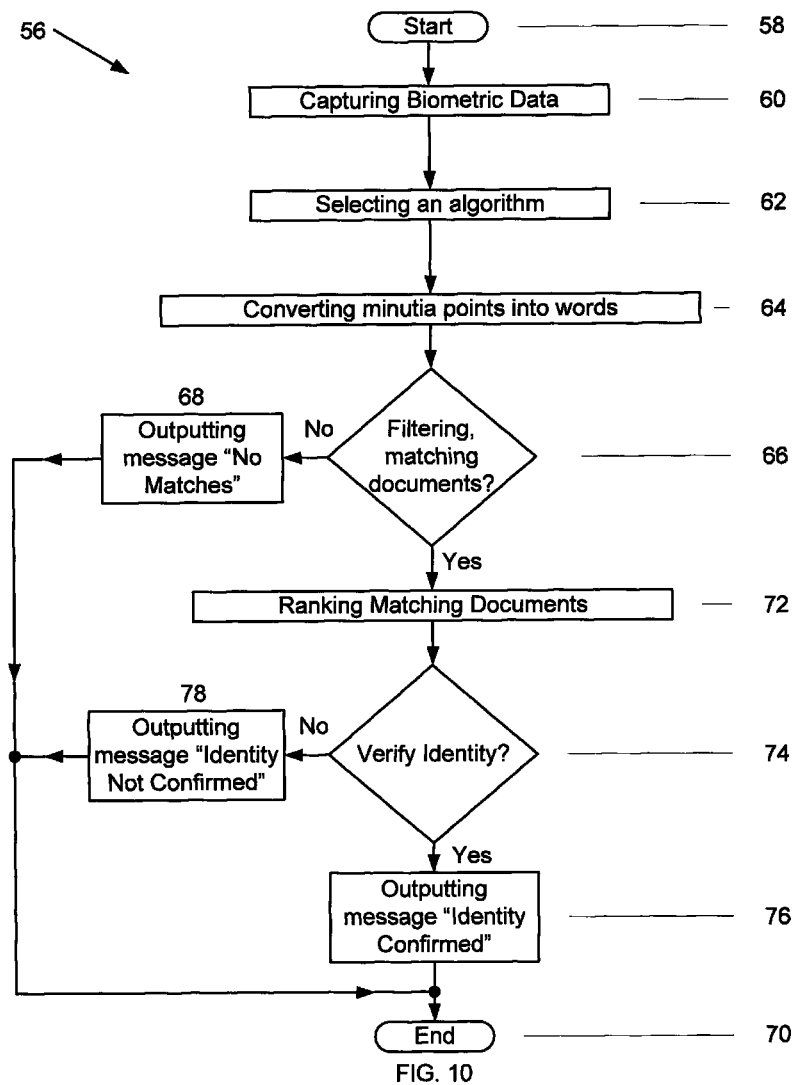
FIG. 10 is a flowchart illustrating an exemplary method for authenticating the identity of an individual using text-based biometric authentication.

FIG. 10 is a flowchart 56 illustrating an exemplary method for authenticating the identity of an individual using text-based biometric authentication. The method starts 58 by capturing biometric data 60, corresponding to the desired biometric type, from an individual at an authentication station (not shown) and processing the captured biometric data into a biometric feature template. In the exemplary method, the desired biometric type is the left index finger. Thus, the biometric feature template includes minutia points MPn of the left index finger. However, in other embodiments any biometric type, or any combination of the same or different biometric types, may be captured and appropriate biometric feature templates generated that facilitate enabling the server system 12 to authenticate the identity of individuals as described herein. Such biometric types include, but are not limited to, face, fingerprint, iris and voice.

The method continues by selecting 62, or determining, an algorithm for converting biometric features of a desired biometric type into biometric text strings, or words. It should be understood that in the exemplary method the same algorithm is used for converting biometric features into words as was used during enrollment. Next, processing continues by converting 64 the minutia points included in the biometric feature template into words using the selected algorithm. The words converted from minutia points MPn are referred to herein as a probe. After converting the minutia points MPn into words 64, the method continues by filtering 66 with the generic filtering module (GFM) application. Specifically, the GFM application compares 66 the probe against the words 52 included in each of the data documents 44. It should be appreciated that a list of potential matches is generated by the GFM application according to the similarity between the probe and the data documents 44 in the server system 12. The GFM application calculates the similarity between the probe and the data documents 44 using predetermined authentication policies and rules included therein.

In the exemplary embodiment, when a comparison does not result in a match between at least one word in a probe and at least one word 52 in a given data document 44, the given data document 44 is discarded, or filtered out. Moreover, when a comparison does not result in a match between at least one word in the probe and at least one word 52 in any of the data documents 44, the method continues by outputting 68 a negative result to the client system 14. The client system 14 then displays a message indicating "No Matches," and the method ends 70. Although the client system 14 displays a message indicating "No Matches" when a comparison does not result in a match in the exemplary embodiment, it should be appreciated that in other embodiments the client system may communicate the negative result in an alternative message or in any manner, including, but not limited to, emitting a sound.

However, when a comparison results in a match between at least one word in the probe and at least one word in at least one data document 44, the at least one data document 44 containing the at least one matching word is identified as a matching document. After comparing 66 the probe against all of the data documents 44 stored in the server system 12, the matching documents are compiled as the list of potential matches. It should be appreciated that the matching documents included in the list of potential matches are ranked 72 in accordance with the authentication policies and rules included in the GFM application. For example, the authentication policies and rules included in the GFM application may rank the matching documents according to the number of matching words contained therein. Thus, the greater the number of matching words contained in a matching document, the more similar a matching document is to the probe. Consequently, the more similar a matching document is to the probe, the higher the ranking of the matching document in the list of potential matches. The ranked list of potential matches is stored in the server system 12 and may be transmitted to the client system 14 and displayed for use at the authentication station.

Although the exemplary method determines a matching document when at least one word in a probe matches at least one word in a data document 44, it should be appreciated that in other embodiments any other matching criteria may be established to determine a matching document that facilitates authenticating the identity of an individual as described herein. Such other criteria include, but are not limited to, determining a matching document when two or more words match between a probe and a data document 44. Although the GFM application ranks the matching documents according to the number of matching words contained therein in the exemplary method, it should be appreciated that in other embodiments the GFM application may use any policy therein such that the matching documents may be ranked in any manner that facilitates authenticating the identity of an individual as described herein.

After ranking the matching documents 72 and storing the list of ranked potential matches in the server system 12, the method continues by verifying the identity 74 of an individual, using well-known biometric authentication techniques. Generally, the server system 12 biometrically authenticates the individual by performing a 1:1 comparison between the captured biometric data and corresponding biometric data included in each of the ranked potential matches. It should be appreciated that in other embodiments any biographic data 46, any biometric data 48, or any combination of biographic 46 and biometric data 48, included in each of the potential matches may be used to verify the identity 74 of the individual at the authentication station. When the identity of an individual at the authentication station is verified 74, a positive result is output 76 to the client system 14 and displayed for use at the authentication station. Specifically, the positive result is a message that indicates "Identity Confirmed," and the authenticating method ends 70.

However, when the identity of the individual at the authentication station is not verified 74, a negative result is output 78 to the client system 14. Specifically, the client system 14 displays the negative result as a message that indicates "Identity Not Confirmed," and the authenticating method ends 70.

It should be appreciated that comparing 66 the words included in a probe against the words included in the data documents 44 constitutes an initial filtering process because the number of data documents 44 to be analyzed when verifying the identity 74 of an individual is quickly reduced to a list of potential matches. By virtue of quickly reducing the number of data documents 44 that are to be analyzed when verifying the identity 74 of an individual, the initial filtering process facilitates reducing the time required to biometrically authenticate individuals. Thus, it should be understood that by filtering out non-matching data documents 44 to quickly generate the list of potential matches, and by generating highly trusted authentication results 74 from the list of potential matches, a method of text-based biometric authentication is provided that accurately, quickly, and cost effectively verifies the identity of individuals.

Although the probe includes only words converted from minutia points MPn in the exemplary method, it should be appreciated that in other embodiments the probe may include a combination of biographic data words and the words converted from the minutia points. In such other embodiments, the biographic data words constitute words representing any biographic data 46 that may be included in the data documents 44 such as, but not limited to, words describing an individual's name, words describing an individual's date of birth, and alphanumeric words describing an individual's address. It should be understood that by virtue of including the combination of biographic data words and the words converted from the minutia points in the probe, the whole identity of an individual may be used for authentication. Moreover, it should be understood that using the whole identity of an individual for authentication facilitates increasing confidence in authentication results. Authentication based on the whole identity of an individual as described herein, is unified identity searching. Thus, including the combination of biographic data words and the words converted from the minutia points in the probe facilitates enabling unified identity searching and facilitates enhancing increased confidence in authentication results. It should be appreciated that in unified identity searching, data documents 44 are determined to be matching documents when at least one of the biographic words included in the probe, or at least one of the words converted from the minutia points included in the probe, matches at least one of the enrollment biographic words or one of the enrollment biometric words, respectively, included in a data document 44.

In the exemplary embodiments described herein, biometric authentication based on words is used to authenticate the identities of individuals at authentication stations. An algorithm for converting biometric feature template data into words is selected, and a method of authenticating the identity of an individual using such words is provided. More specifically, the selected algorithm converts the biometric feature template data into words. The words are used in a first processing stage of filtering to generate the list of potential matches, and each of the potential matches is subject to a second processing stage of 1:1 matching that uses well-known biometric authentication techniques. As a result, because text-based searching is more efficient, less time consuming and less expensive than image based searching, authentication station security personnel are able to verify the identity of an individual at an authentication workstation quickly, accurately and cost effectively. Moreover, it should be appreciated that by authenticating an individual with text-based searching as described herein, industry standard text search engines may be leveraged such that efficiency of biometric authentication is facilitated to be increased, the time and costs associated with such authentications are facilitated to be reduced, and modification of known biometric authentication search engines is facilitated to be easier such that known search engines may operate with other authentication systems. Furthermore, text-based searching as described herein facilitates enhancing continued investment in search engine technology.

Exemplary embodiments of methods for authenticating the identity of an individual using biometric text-based authentication techniques are described above in detail. The methods are not limited to use at an authentication station as described herein, but rather, the methods may be utilized independently and separately from other methods described herein. For example, the method of authenticating the identity of an individual may be performed by a lone individual at a remote personal computer to verify that the lone individual may access protected data stored in a computer repository. Moreover, the invention is not limited to the embodiments of the method described above in detail. Rather, other variations of the method may be utilized within the spirit and scope of the claims.

Furthermore, the present invention can be implemented as a program stored on a computer-readable recording medium, that causes a computer to execute the methods described herein to verify the identity of an individual using words derived from biometric feature templates. The program can be distributed via a computer-readable storage medium such as, but not limited to, a CD-ROM.

While the invention has been described in terms of various specific embodiments, those skilled in the art will recognize that the invention can be practiced with modification within the spirit and scope of the claims.

What is claimed is:

1. A method of text-based biometric authentication comprising:

generating a biometric image from biometric data with a server system, the biometric image including biometric features, the server system storing data documents corresponding to different individuals, each data document including enrollment biometric words;

superimposing a positional relationship medium on the biometric image, the positional relationship medium including cells, each cell being described with a word derived from the positional relationship medium, adjacent cells include a common border;

establishing an overlapping border region between respective adjacent cells;

determining a biometric feature included in the biometric features is positioned in an overlapping border region;

deriving a word for each adjacent cell associated with the overlapping border region; and comparing the derived words against the enrollment biometric words in each data document, and identifying a data document as a matching data document when a derived word matches an enrollment biometric word.

2. A method of text-based biometric authentication in accordance with claim 1, said generating operation further comprising extracting at least one minutia point from fingerprint biometric data, wherein the at least one minutia point represents the biometric feature.

3. A method of text-based biometric authentication in accordance with claim 2, further comprising establishing intersecting border regions at intersections of overlapping border regions.

4. A method of text-based biometric authentication in accordance with claim 1, said deriving operation comprising constructing a sentence from the derived words to describe the position of the biometric feature.

5. A method of text-based biometric authentication in accordance with claim 1, said deriving operation comprising one of:
    generating words using sectors and bands of the positional relationship medium; and
    generating words using radial line and circle designations of the positional relationship medium.

6. A method of text-based biometric authentication in accordance with claim 1, said generating operation further comprising:
    capturing iris biometric data; and
    extracting at least phase information and masking information from the captured iris biometric data.

7. A method of text-based biometric authentication in accordance with claim 1, further comprising:
    assigning a cell number to each cell; and
    translating each word into a single cell number.

8. A system for text-based biometric authentication comprising:
    a computer configured as a server, said server including at least a data base and being configured to store within said database at least a data document gallery comprising data documents, each data document corresponding to a different individual and including enrollment biometric words; and
    at least one client system operationally coupled to said server, said client system configured to at least capture biometric data from an individual, said server being further configured to
        generate a biometric image from biometric data, the biometric image including biometric features,
        superimpose a positional relationship medium on the biometric image, the positional relationship medium including cells, each cell being described with a word derived from the positional relationship medium, adjacent cells include a common border,
        establish an overlapping border region between respective adjacent cells, determine a biometric feature included in the biometric features is positioned in an overlapping border region,
        derive a word for each adjacent cell associated with the overlapping border region in which the biometric feature is positioned, and
        compare the derived words against the enrollment biometric words in each data document, and identify a data document as a matching data document when a derived word matches an enrollment biometric word.

9. A system for text-based biometric authentication in accordance with claim 8, said client system being further configured to capture fingerprint biometric data, and said server being further configured to derive at least one minutia point from the captured fingerprint biometric data, wherein the at least one minutia point represents the biometric feature.

10. A system for text-based biometric authentication in accordance with claim 8, said server being further configured to establish intersecting border regions at intersections of overlapping border regions.

11. A system for text-based biometric authentication in accordance with claim 8, said server being further configured to:
    compile the matching data documents into a list of potential matches;
    rank the potential matches according to a number of matching words contained therein; and
    verify the identity of an individual by comparing the captured biometric data against corresponding biometric data in each ranked potential match.

12. A method of text-based biometric authentication comprising:
    generating cells, each cell including at least one border, and positioning cells adjacent each other to define a border between each pair of adjacent cells;
    when a biometric feature included in a biometric template is positioned proximate a common border between adjacent cells determining that the biometric feature is located in each cell adjacent the common border with a processor, the processor operable to communicate with a memory that stores data documents corresponding to different individuals, each data document including enrollment biometric words;
    deriving a word for each cell adjacent the common border; and
    comparing the derived words against the enrollment biometric words in each data document, and identifying a data document as a matching data document when a derived word matches an enrollment biometric word.

13. A method of text-based biometric authentication in accordance with claim 12, further comprising expanding the border between adjacent cells to establish an overlapping border region between adjacent cells.

14. A method of text-based biometric authentication in accordance with claim 13, wherein positions of biometric features included in the biometric template are permitted to vary in the overlapping border regions.

15. A method of text-based biometric authentication in accordance with claim 12, said generating operation further comprising defining the at least one border of each cell with concentric circles and radial lines.

16. A method of text-based biometric authentication in accordance with claim 15, said generating operation further comprising generating a positional relationship grid with the concentric circles and radial lines.

17. A method of text-based biometric authentication in accordance with claim 1, further comprising:
    adding biometric data to the data document for an individual; and
    converting the biometric data into biometric words and adding the biometric words to the data document for the individual.

18. A system for text-based biometric authentication in accordance with claim 8, said server being further configured to:

add biometric data to the data document for an individual; and convert the biometric data into biometric words and add the biometric words to the data document for the individual.

19. A method of text-based biometric authentication in accordance with claim 12, further comprising:

adding biometric data to the data document for an individual; and converting the biometric data into biometric words and adding the biometric words to the data document for the individual.

\* \* \* \* \*